Jan. 8, 1935.  H. B. COOLEY  1,987,362
CUP MAKING MACHINE
Filed March 6, 1933    6 Sheets-Sheet 1

Jan. 8, 1935.  H. B. COOLEY  1,987,362
CUP MAKING MACHINE
Filed March 6, 1933  6 Sheets-Sheet 2

INVENTOR
Henry B. Cooley,
by
Arthur B. Jenkins,
ATTORNEY

Jan. 8, 1935.  H. B. COOLEY  1,987,362
CUP MAKING MACHINE
Filed March 6, 1933   6 Sheets-Sheet 3
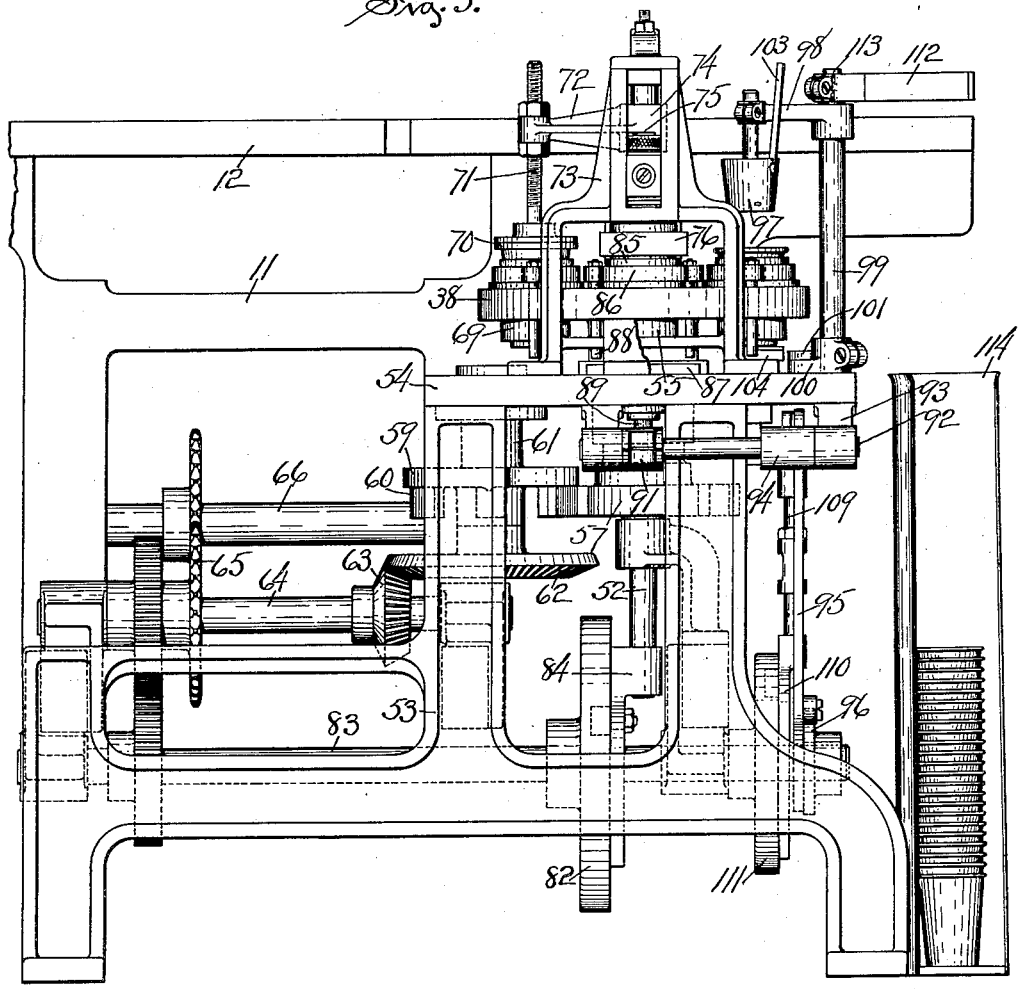

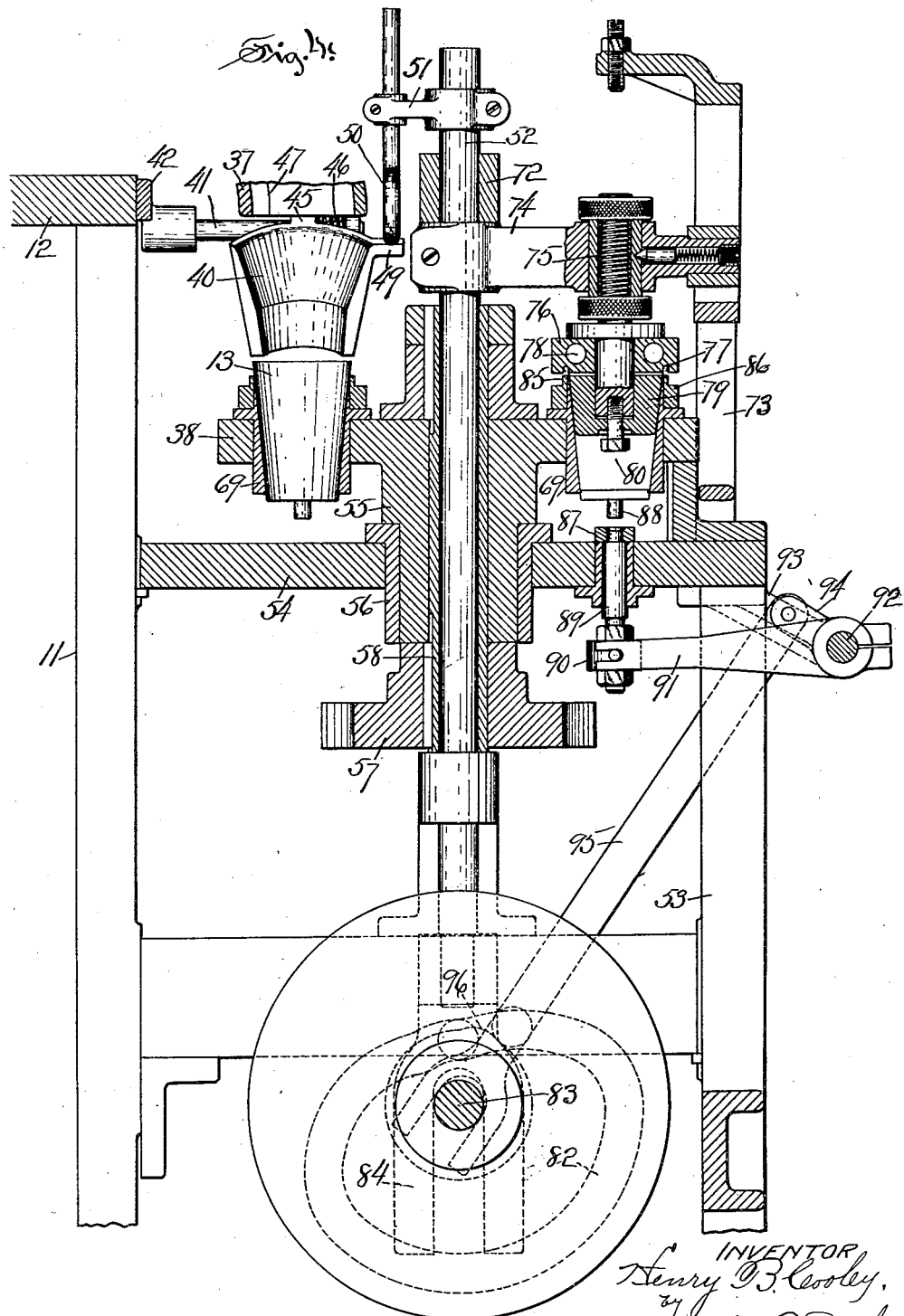

Jan. 8, 1935.   H. B. COOLEY   1,987,362
CUP MAKING MACHINE
Filed March 6, 1933   6 Sheets-Sheet 5
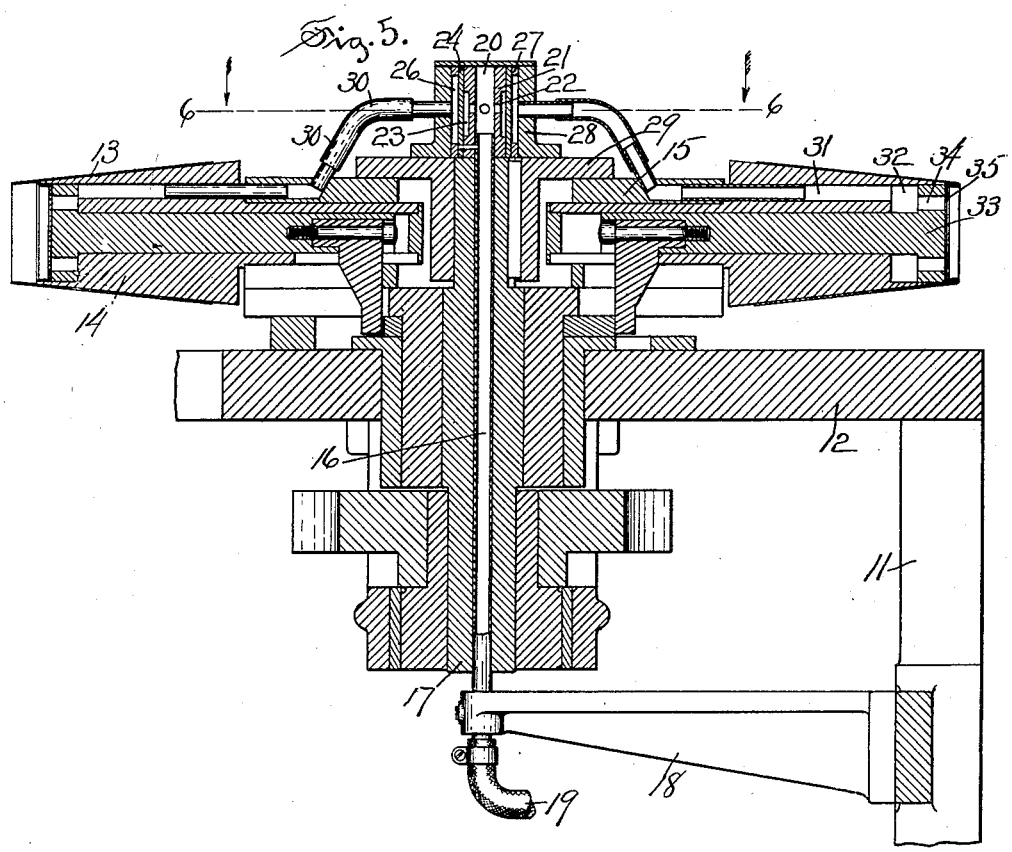
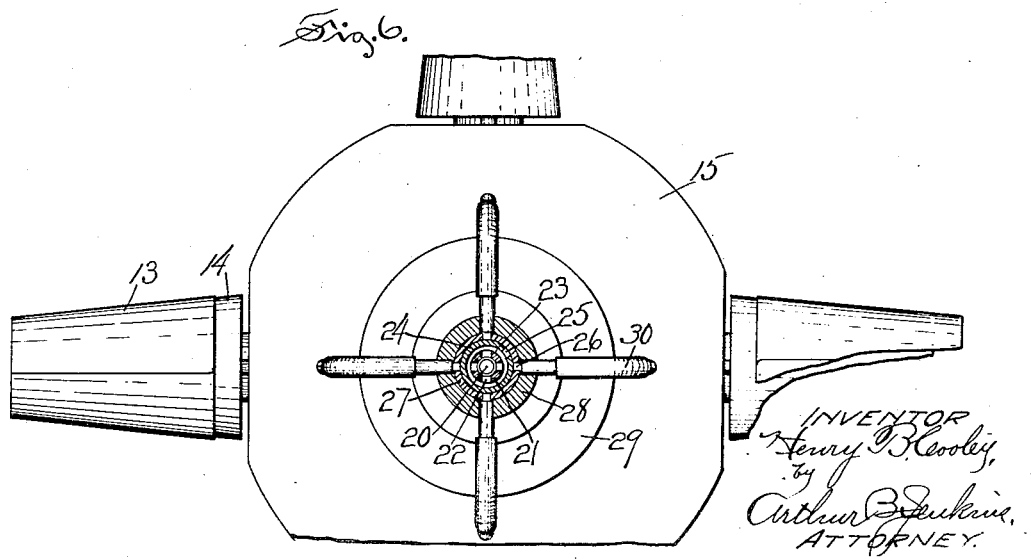

Jan. 8, 1935.    H. B. COOLEY    1,987,362
CUP MAKING MACHINE
Filed March 6, 1933    6 Sheets-Sheet 6
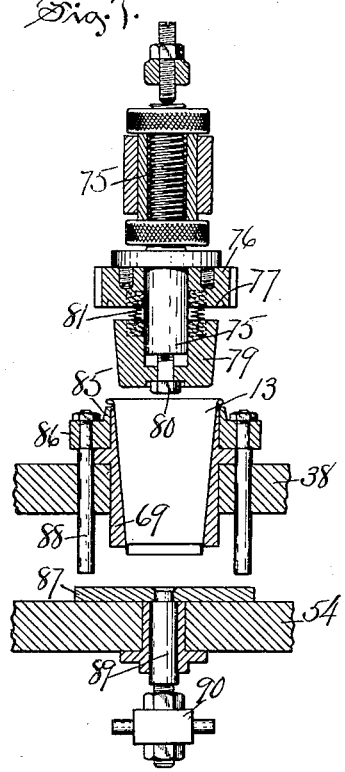
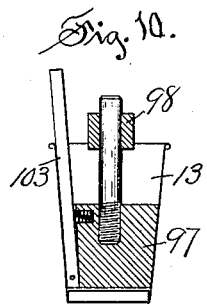
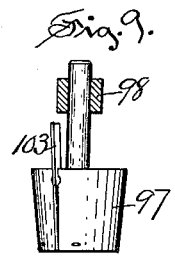
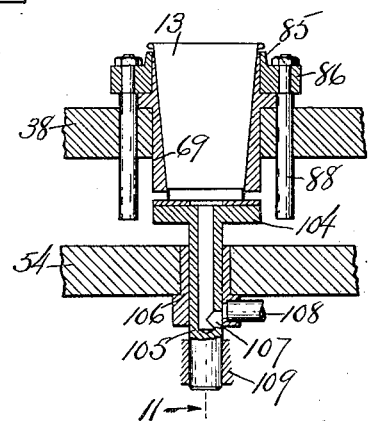
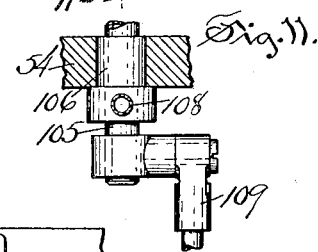
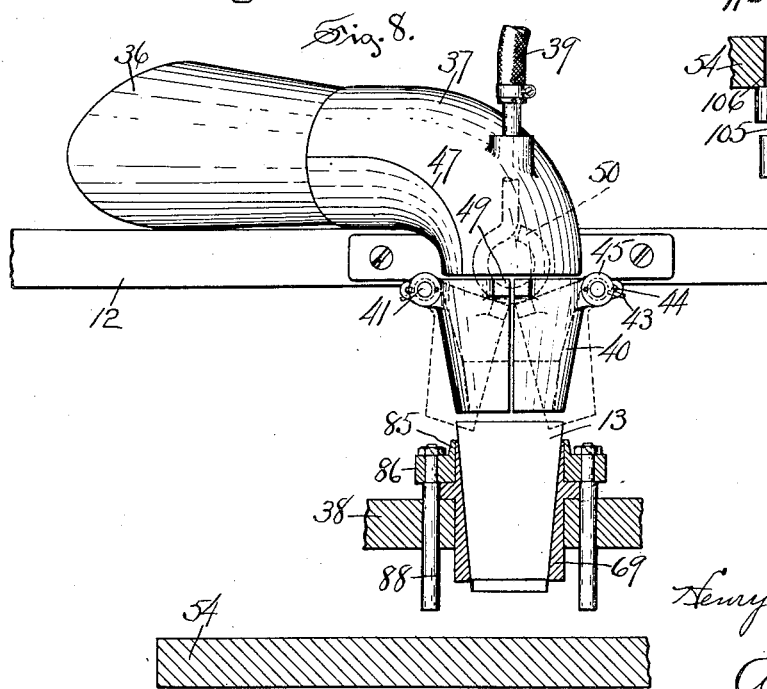

Patented Jan. 8, 1935

1,987,362

UNITED STATES PATENT OFFICE 1,987,362

CUP MAKING MACHINE

Henry B. Cooley, Kensington, Conn., assignor to The American Paper Goods Company, Montclair, N. J., a corporation of New Jersey Application March 6, 1933, Serial No. 659,811

22 Claims. (Cl. 93—39)

My invention relates to that class of machines employed for making cups or similar receptacles from paper or other thin flexible material, and an object of my invention, among others, is to provide means for producing a nicely finished edge on the cups, and further to transfer and dispose of the cups after they have been operated upon in a rapid and efficient manner.

One form of a machine embodying my invention and in the construction and use of which the objects herein set out, as well as others, may be attained, is illustrated in the accompanying drawings, in which—

Figure 3 is a front view partially broken away.

Figure 4 is a view on enlarged scale in section on a plane denoted by the dotted line 4—4 of Fig. 1.

Figure 5 is a view on still further enlarged scale in section along the axis of the turret.

Figure 6 is a view in section on a plane denoted by the dotted line 6—6 of Fig. 5.

Figure 7 is a view on enlarged scale in section on a plane denoted by the dotted line 7—7 of Fig. 1.

Figure 8 is a similar view on a plane denoted by the dotted line 8—8 of Fig. 1.

Figure 9 is a view in section on a plane denoted by the dotted line 9—9 of Fig. 1.

Figure 10 is a view in section on a plane denoted by the dotted line —10.

Figures 7 to 10 are on the same scale as Figure 4.

Figure 11 is a view in section on a plane denoted by the dotted line 11— of Fig. 9.

Figure 1:
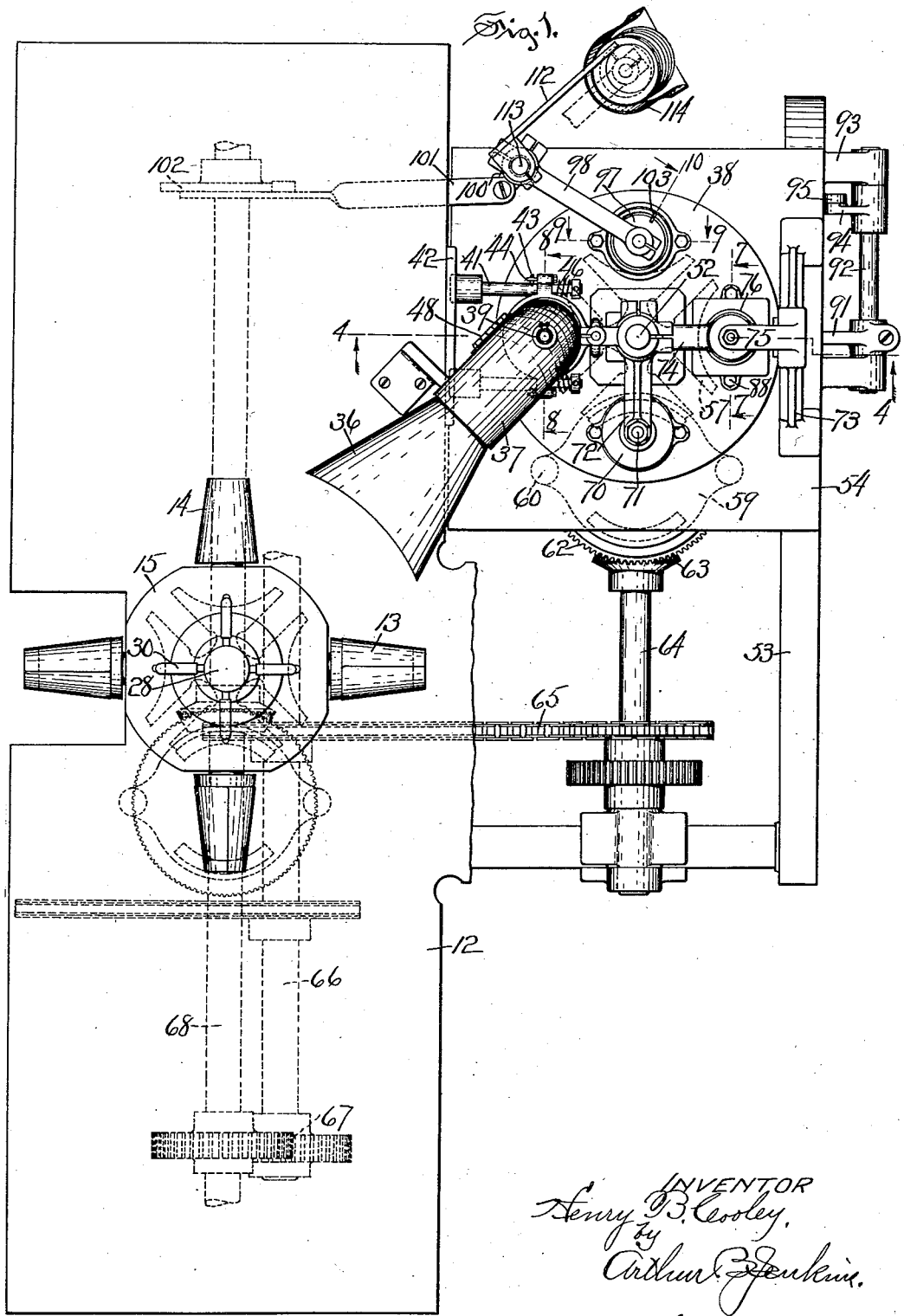
Figure 1 is a top view of a portion of a cup making machine embodying my invention.

In the accompanying drawings the numeral 11 denotes generally a portion of the main frame of my improved machine embodying a table 12 on which a cup forming turret is mounted, details of the mounting of such turret being omitted from the description herein as not necessary to a full understanding of that portion of the machine forming the subject matter of this application. It is briefly stated that this turret has a step-by-step rotating movement during which the cup bodies 13 are formed upon mandrels 14 in any suitable manner, such mandrels projecting radially from the base 15 of the turret. My invention relates to the means for removing the cups from the mandrels after they have been formed thereon and this is specifically shown in Figure 5 of the drawings. An air supply tube 16 projects upwardly through the spindle 17 of the turret, the lower end of said tube being secured in a bracket 18 projecting from the frame 11. A tube 19 is connected with any suitable source for supply of air under pressure. The tube 16 opens into an air supply chamber 20 in a head 21 which is rigidly secured to and held from rotation by the tube 16. Ports 22 extend from the chamber 20 into an annular chamber 23 formed by cutting an annular groove in the head 21. A distributor sleeve 24 comprises the outer wall of the chamber 23 and has a distributor port 25 which is adapted to register with delivery passages 26 in a sleeve 27 located in a hub 28 rigidly connected with the turret base 15, in the structure herein shown said hub being mounted on a plate 29 secured to said base, a further description of said plate not being necessary to an understanding of my present invention.

Delivery tubes 30 extend radially through the hub 28 and establish communication between the delivery passages 26 and passages 31 in the mandrels, which passages extend into chambers 32 in the outer ends of the mandrels. Pistons 33 are located in the chambers 32 but as they are employed in the making of the cups a detailed description is omitted herein further than to state that ports 34 in said pistons permit air pressure in the passages 31 to be exerted upon the bottoms 35 of said cups. While the ports 34 are shown on the lefthand side of Fig. 5 as being closed, or nearly so, this is immaterial, as the air pressure in the chamber 32 is entirely regulated by the port 25 in the sleeve 24 after the several tubes 30 are brought into registry with said port 25.

In the operation of that portion of the machine thus far described, as the mandrels reach the position shown on the right in Fig. 5, the piston 33 being in its outward position, the cup, so far as the cup making turret is concerned, is completed and ready to be discharged from the mandrel. As the turret is moved from this position the delivery passage 26 appurtenant to such mandrel registers with the distributing port 25 (see Fig. 6), and the air pressure is admitted from the chamber 20 through the ports and passages described to take effect on the bottom of the cup which is promptly forced from the mandrel at the time said mandrel is opposite the mouth of a transfer chute 36 leading to a conveying tube 37 extending to a secondary turret 38 now to be described, the cup in this operation being blown into the hopper.

It has been found that as the cups enter the hopper 36 air pressure within the conveying tube 37 prevents the cup from passing into said tube and in many instances they will rebound from within the hopper 36. Therefore to assist movement of the cups through the tube 37 an air tube 39 is extended into the elbow of the tube 37 and in line with the outlet opening of said tube. This air tube 39 is connected with any suitable source of supply for air under pressure, and this is preferably the same source as supplies the tube 19. The supply of air through the tube 39 may be regulated in any suitable manner this not being material to my present invention.

A holder is located at the outlet end of the tube 37, this holder comprising two members 40 pivotally supported by rods 41 extending from a bar 42 secured to the edge of the table 12. Each of the rods 41 has a laterally extending stop pin 43 located in the path of a stop pin 44 projecting from ears 45 on the members 40, engagement of said pins limiting movement of the members toward each other and thereby determining the closed positions of said members to receive the cups from the tube 37. Springs 46 may be employed to urge the members 40 toward each other.

The tube 37 is formed in halves the meeting edges of which are on a line 47, as shown in Fig. 8 of the drawings. A hinge 48 unites the halves on the opposite side of the tube from said edges and as shown in Fig. 1. This enables the tube to be readily opened for any purpose desired. Opening lugs 49 are formed in proximity to the meeting edges near the top of the two members 40, said lugs being located in the path of movement of an opener 50 in the form of a ring depending from an opener arm 51 secured to and projecting laterally from an actuator rod 52 to be hereinafter described.

The secondary or finishing turret 38 is mounted on a secondary turret frame 53 comprising a secondary turret table 54 secured to and projecting from the main frame 11 at the front thereof. The turret has a hub 55 rotatably mounted in a bushing 56 in the table 54 and said turret has a step-by-step movement imparted to it by means of a wheel 57 of a Geneva movement, said wheel being secured to the lower end of a driving sleeve 58 projecting through the hub 55 and secured thereto. The actuating rod 52, hereinbefore referred to, has a longitudinal movement in said sleeve, and as shown in Fig. 4 of the drawings. The wheel 57 is driven by means of the actuating wheel 59 of the Geneva movement said wheel 59 having studs 60 to engage in the notches in the driven wheel in a manner well known by those skilled in the art. The wheel 59 is secured to a shaft 61 mounted in a vertical position in the frame 53 and having a beveled gear 62 at its lower end meshing with a beveled pinion 63 secured to a secondary driving turret shaft 64 also mounted in the frame 53, and as shown in Fig. 3 of the drawings. The shaft 64 is driven as by means of a sprocket wheel and sprocket chain 65 connection (see Fig. 1) with a main driving shaft 66 mounted in the main frame 11 of the machine. The shaft 66 has a geared connection 67 with a main turret actuating shaft 68, also mounted in the main frame, this shaft 68 being referred to at this point, as it will be hereinafter mentioned in connection with actuating mechanism appurtenant to the secondary or finishing turret.

When the cups are released by the holding members 40 they drop into a recess shaped to fit the cups in a receiver 69 of which there are, in the construction herein shown, four in the turret 38. From the location at which they receive the cups, as shown in Fig. 4, the receivers are moved by a one-step movement of the turret to the next position which underlies a lubricating pad 70 secured to the lower end of a rod 71 adjustably secured at its upper end to an arm 72 projecting from the actuating rod 52, and as shown in Figs. 1 and 3 of the drawings. This pad may be supplied with any suitable treating material, as vaseline, by smearing the pad with such substance manually or otherwise, and when moved downwardly by the rod 52 the lubricant is applied to the upper end of the cup and this aids in the operation of overturning such end to form a lip at the next station to which it is moved in the next one-step movement of the turret.

At this lip forming station is located a guide frame 73 having a guideway to receive and guide the outer end of an arm 74 secured to and projecting from the actuating rod 52. A supporting stud 75 for lip-forming mechanism is adjustably secured to the arm 74, projecting downwardly therefrom, a lip-forming die 76 being secured to the stud, said die having an annular forming groove 77 in its under surface and holes 78 to receive heating elements of any suitable character, preferably electrical.

A clamp 79 is movably supported at the lower end of said stud, said clamp being shaped to fit within the upper end of a cup in the receiver 69 to clamp the cup firmly therein. The clamp has a movement lengthwise of the stud 75 and is retained thereon by a retaining screw 80 screwed into the lower end of the stud, and springs 81 located between the clamp and forming die 76 press the clamp downwardly.

Figure 2:
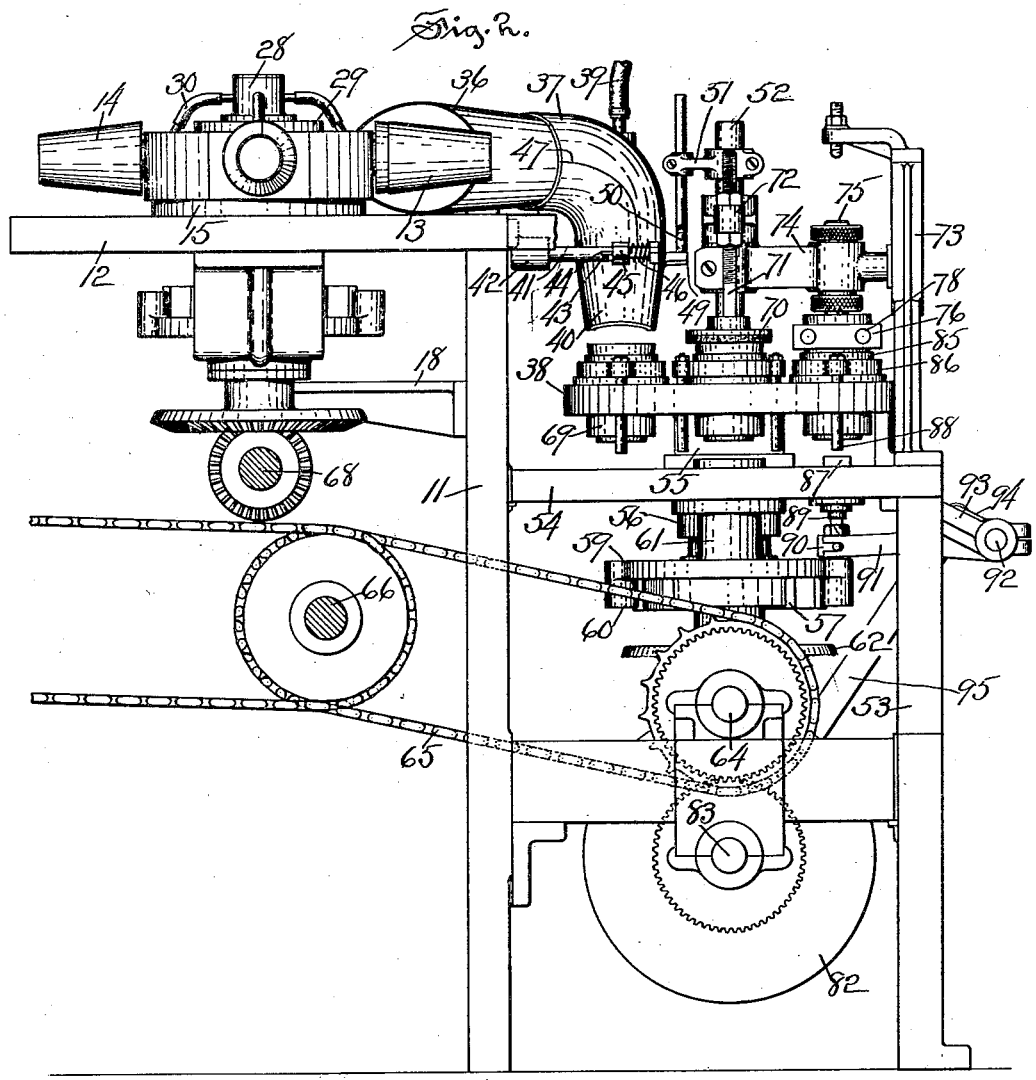
Figure 2 is a side view of the same.

The actuating rod 52 is operated by a cam 82 secured to a cam shaft 83 mounted in the frame 53 and driven by means of intermeshing gears from the turret operating shaft 64, and as shown in Figs. 2 and 3 of the drawings. A fork 84 secured to the lower end of the rod 52 has a roller engaged in a groove in the cam in a well known manner.

In operation, after the edge of the cup has been treated with suitable material, as hereinbefore described, the turret places the cup underneath the lip-forming mechanism and the heated die 76 is moved downwardly by the rod 52, the edge of the cup entering the groove 77 and turning the lip outwardly and downwardly as shown in Fig. 4. Following this operation of the die 76 the receiver with the cup therein is raised and a lip 85 on a lower die 86 is pressed against the partially turned lip, turning it against the side of the cup and thereby creating a practically round edge on the cup. This upward movement of the receiver is effected by means of an actuating bar 87 moved against pins 88 projecting from opposite sides of the receiver, and as shown in Fig. 7. The bar 87 has an actuating pin 89 secured thereto and projecting through the table 54, its lower end having an actuating block 90 adjustably secured thereto and having laterally projecting pins engaged by a lever 91 secured to a shaft 92 mounted in brackets 93 secured to the under side of the table 54. An arm 94 secured to the shaft 92 is actuated by a rod 95 having a forked lower end and a roller engaged with a cam 96 on the cam shaft 83, said cam being shaped and timed in its rotation to produce the necessary action of the actuating pin 89 at the proper time.

After the cups are finished, as just described, they are moved to a discharging station directly under a catcher 97 formed to loosely fit the interior of the cups, as shown in Fig. 10 of the drawings. The stem of this catcher is secured in a shifting bar 98 extending radially from a shifting sleeve 99 rotatably mounted on a post secured to and rising from the table 54. A shifting arm 100 projects laterally from said sleeve and is connected by a shifting rod 101 with a shifting cam 102 secured to the turret actuating shaft 68 hereinbefore referred to. The end of the rod 101 is forked to straddle the shaft and has a roller in contact with the cam as is common in structures of this type. A cup holder 103 in the form of a strip is pivotally mounted at its lower end in a groove in the catcher 97 and is spring pressed outwardly to engage the sides of the cups and hold them in place on the catcher.

At the discharging station the receivers are positioned over a discharging disk 104 having a tubular stem 105 mounted for reciprocating movement in a sleeve 106 secured in the table 54. The passage through the tube opens by a port 107 into communication with an air tube 108 connected with any suitable source of supply for air. The port 107 is closed to entrance of air from the tube 108 when the discharge disk is in its lowermost position. The stem 105 is secured to an actuating rod 109, as shown in Fig. 11, said rod having a fork 110 at its lower end straddling the shaft 83 and having a roller engaged in a groove in a box cam 111 secured to said shaft. A releasing arm 112 is secured to the upper end of the post 113 upon which the sleeve 99 is mounted.

In the operation of discharging cups when the receivers 69 are halted at the discharging station the cam 111 operates the discharging disk 104 to raise it into contact with the bottom edge of the cup thereby loosening it in its socket in the receiver. In this upward movement of said disk and its stem the port 107 is opened into communication with the air tube 108 and the air pressure blows the cup from within the receiver on to the catcher 97, and as shown in Fig. 10. In this operation the holder 103 is pressed slightly inward and its spring presses it outwardly to contact with the cup, thereby holding the latter in place. Following engagement of the cup with the catcher the cam 102 operates through the rod 101 to rotate the sleeve 99, thereby moving the catcher from its position over the receiver to a position over a receiver 114 in the form of a vertically positioned trough. As the cup is swung to this position the holder 103 engages the arm 112 moving the holder inwardly and releasing its pressure upon the cup and the latter drops into the receiver 114, as shown in Fig. 3 of the drawings.

In accordance with the provisions of the patent statutes I have described the principles of operation of my invention together with the device which I now consider to represent the best embodiment thereof; but I desire to have it understood that the device shown is only illustrative and that the invention may be carried out by other means and applied to uses other than those above set out.

I claim:

1. A cup making machine including a movably mounted carrier with a projecting mandrel for the formation of cups thereon, said mandrel having an air passage extending to the bottom thereof, an air chamber within said carrier to contain air under pressure and having communication with said air passage, and means rigid with said carrier and moved thereby to solely control supply of air from said chamber to said passage.

2. A cup making machine including a movably mounted carrier with a projecting mandrel for the formation of cups thereon, said mandrel having an air passage extending to the bottom thereof, an air chamber within said carrier to contain air under pressure and having communication with said air passage, and means rigidly secured to said carrier and movable therewith to solely control supply of air from said chamber to said passage.

3. A cup making machine including a turret, mandrels projecting from said turret for the formation of cups thereon, said mandrels each having air passages extending to the bottoms thereof, a head at the center of said turret having an air chamber therein communicating with said air passages, and a valve rigidly carried by said head and movable therewith to solely control flow of air to said passages.

4. A cup making machine including a rotatably mounted turret, mandrels projecting therefrom for the formation of cups thereon, said mandrels each having air passages extending to the bottoms thereof, a head mounted at the axial center of said turret said head having an air chamber, and a valve sleeve surrounding said head and rigidly secured to said turret to rotate therewith, said sleeve having a port to register with the ports in the head.

5. A cup making machine including a rotatably mounted turret, mandrels projecting therefrom for the formation of cups thereon, said mandrels each having an air passage extending to the bottom thereof, a head and a stationary valve sleeve surrounding said head, and means for imparting relative movement to said head and sleeve, said head having air ports and said sleeve having a port to successively register with those in the head to deliver air to said air passages.

6. A cup making machine including a movably mounted carrier, mandrels projecting therefrom for the formation of cups thereon, said mandrels each having an air passage extending to the bottom thereof, and a head and a stationary valve sleeve, said sleeve surrounding said head, the latter having air ports and the sleeve having a port to register successively with the ports in the head, and a communicating passage to convey air from the port in the sleeve to the passages in the mandrels.

7. A cup making machine including a movably mounted carrier, a mandrel projecting from said carrier, a hopper located adjacent the path of movement of the end of said mandrel, means for loosening cups from said mandrel, and means for creating a partial vacuum within said hopper.

8. A cup making machine including a rotatably mounted carrier, mandrels projecting from said carrier to receive cups therein, a hopper located adjacent to the path of movement of the ends of said mandrels, means for loosening cups from said mandrels, and means for creating a partial vacuum within said hopper.

9. A cup making machine including a movably mounted carrier, a mandrel projecting from said carrier, a hopper having its mouth located adjacent the path of movement of the end of said mandrel and having an extension with an elbow therein, and means for delivering a current of air through said elbow to the discharge end of said extension.

10. A cup making machine including a movably mounted carrier, a mandrel projecting from said carrier, a hopper having its mouth located adjacent the path of movement of the end of said mandrel, means for loosening cups from said mandrel, means for creating a partial vacuum within said hopper, and a holder to receive cups discharging from said hopper.

11. A cup making machine including movably mounted carrier, a mandrel projecting from said carrier, a hopper having a mouth located adjacent the path of movement of the end of said mandrel, means for loosening cups from said mandrel for delivery into said hopper, a holder composed of separable members to receive cups from said hopper, and means for separating said holder members to release cups therefrom.

12. A cup making machine including a carrier having a recess for the reception of cups therein, a die member having a lip-forming groove to receive the edges of cups located in said recess, and a plurality of means for imparting different relative movements between said recess and die to engage the edges of cups in said groove to overturn said edges.

13. A cup making machine including a carrier, a receiver affixed to said carrier and including a die member, another die member having a lip-forming groove to receive the edges of cups located in said receiver, means for imparting relative movement between said die members to overturn said lips, and different means for imparting further relative movement between said die members to finish the formation of said lips.

14. A cup making machine including a carrier, a receiver affixed to said carrier and including a die member, another die member having a lip-forming groove to receive the edges of cups located in said receiver, means for moving the grooved die member into contact with the edges of said cups to overturn said edges, and means for moving the other die member into contact with said overturned edges to complete the formation thereof.

15. A cup making machine including a carrier, a receiver movably mounted in said carrier and including a die member, another die member having lip-forming grooves to receive the edges of cups located in said receiver, means for engaging the edges of cups in said groove to overturn lips thereon, and means for moving said receiver and die member thereon into contact with said overturned lips to finish them.

16. A cup making machine including a carrier, a receiver movably mounted in said carrier and including a die member, another die member having a lip-forming groove to receive the edges of cups located in said receiver, a clamp carried with said last mentioned die member, means for engaging said clamp in cups carried by said receiver and for engaging the edges of cups in said die groove to overturn said edges, and means for moving said receiver and die member thereon into contact with said overturned edges to finish them.

17. A cup making machine including a movably mounted carrier having a recess for cups therein, a catcher shaped to fit within said cups, means for engaging the catcher within said cups, means for retaining cups on said catcher, and means for releasing cups from said catcher.

18. A cup making machine including a movably mounted carrier having a recess for cups therein, a catcher shaped to fit within said cups, means for engaging the catcher within said cups, means for retaining cups on said catcher, means for moving said catcher from above said recess, and means for releasing cups from said catcher.

19. A cup making machine including a movably mounted carrier having a recess for cups therein, a catcher shaped to fit within said cups, means to engage the catcher within said cups, means on the catcher to frictionally engage cups to retain them on the catcher, and means for releasing said retaining means to release said cups.

20. A cup making machine including a movably mounted carrier having a recess for cups therein, means for admitting air under pressure to said recess to force cups therefrom, a catcher shaped to fit within said cups and to receive them when blown from said recess, means for retaining cups on said catcher, and means for releasing cups therefrom.

21. A cup making machine including a movably mounted carrier having a recess for cups therein, a catcher shaped to fit within said cups, means for admitting air under pressure to said recess to blow cups therefrom onto said catcher, means for retaining cups on said catcher, means for moving said catcher for the discharge of cups therefrom, and means for releasing cups from said catcher.

22. A cup making machine including a movably mounted carrier having a recess for cups therein, an inlet for air under pressure to said recess, a valve to control said inlet, a cup discharging member, means for moving said member to loosen said cups from said recess and to operate said valve to admit air to the recess, a catcher shaped to fit the interior of said cups, said catcher being located to receive cups blown from said recess, and means for removing cups from said catcher.

HENRY B. COOLEY.